(12) United States Patent
Lee

(10) Patent No.: US 7,478,872 B2
(45) Date of Patent: Jan. 20, 2009

(54) SEAT ASSEMBLY

(76) Inventor: Daniel Lee, No. 323, Chung-Hua Rd., Nantou City (TW)

( * ) Notice: Subject to any disclaimer, the term of this patent is extended or adjusted under 35 U.S.C. 154(b) by 161 days.

(21) Appl. No.: 11/449,776

(22) Filed: Jun. 9, 2006

(65) Prior Publication Data

US 2008/0001445 A1    Jan. 3, 2008

(51) Int. Cl.
*B62J 1/00* (2006.01)
*B62J 1/18* (2006.01)

(52) U.S. Cl. .............. 297/214; 297/201; 297/202; 297/195.1

(58) Field of Classification Search ........... 297/201, 297/202, 214, 195.1
See application file for complete search history.

(56) References Cited

U.S. PATENT DOCUMENTS

| | | | | | |
|---|---|---|---|---|---|
| 532,444 | A | * | 1/1895 | Christy | 297/202 |
| 594,316 | A | * | 11/1897 | Basch | 297/202 |
| 3,243,231 | A | * | 3/1966 | Duffy | 297/202 |
| 3,997,214 | A | * | 12/1976 | Jacobs | 297/214 |
| 4,218,090 | A | * | 8/1980 | Hoffacker et al. | 297/214 |
| 4,367,896 | A | * | 1/1983 | Nieddu | 297/195.1 |
| 4,842,332 | A | * | 6/1989 | Conner et al. | 297/214 |
| 5,348,369 | A | * | 9/1994 | Yu | 297/214 |
| 5,388,887 | A | * | 2/1995 | Read | 297/214 X |
| 5,714,108 | A | * | 2/1998 | Girardi et al. | 297/214 X |
| 5,720,518 | A | * | 2/1998 | Harrison | 297/214 |
| 5,823,618 | A | * | 10/1998 | Fox et al. | 297/201 |
| 5,911,475 | A | * | 6/1999 | Nakahara | 297/202 X |
| 6,095,601 | A | * | 8/2000 | Yu | 297/202 X |
| 6,450,572 | B1 | * | 9/2002 | Kuipers | 297/202 X |
| 6,629,728 | B2 | * | 10/2003 | Losio et al. | 297/202 X |
| 6,666,507 | B1 | * | 12/2003 | Ringgard | 297/195.1 |
| 6,739,656 | B2 | * | 5/2004 | Yu | 297/201 X |
| 7,055,900 | B2 | * | 6/2006 | Losio et al. | 297/202 X |
| 7,059,674 | B2 | * | 6/2006 | Garland et al. | 297/202 |
| 7,178,869 | B2 | * | 2/2007 | Ljubich | 297/201 |
| 2005/0046245 | A1 | * | 3/2005 | Yu | 297/214 |
| 2005/0121951 | A1 | * | 6/2005 | Yu | 297/195.1 |
| 2005/0212337 | A1 | * | 9/2005 | Lee | 297/214 |
| 2007/0108808 | A1 | * | 5/2007 | Chuang | 297/195.1 |
| 2007/0194610 | A1 | * | 8/2007 | Lee | 297/195.1 |
| 2008/0179925 | A1 | * | 7/2008 | Chuang | 297/214 |
| 2008/0197680 | A1 | * | 8/2008 | Chuang | 297/214 |

* cited by examiner

*Primary Examiner*—Rodney B. White
(74) *Attorney, Agent, or Firm*—Davidson Berquist Jackson & Gowdey, LLP

(57) ABSTRACT

A seat assembly includes a pad body having front and rear end portions, and a supporting member secured to the pad body. The supporting member includes a frame having front and rear end portions, a front resilient unit extending from the front end portion of the frame and disposed between the pad body and the frame, and a rear resilient unit extending from the rear end portion of the frame and disposed between the pad body and the frame. The front and rear resilient units support the front and rear end portions of the pad body, respectively.

6 Claims, 9 Drawing Sheets

SEAT ASSEMBLY

BACKGROUND OF THE INVENTION

1. Field of the Invention

This invention relates to a seat assembly, more particularly to a seat assembly including a pad body having front and rear end portions, and a supporting member secured to the pad body and having front and rear resilient units to support the front and rear end portions of the pad body, respectively.

2. Description of the Related Art

Referring to FIG. 1, a conventional seat assembly 1, such as a seat mounted on a bicycle for a rider's sitting, includes a pad body 11 that has a bottom surface 111, and front and rear end portions 112, 113, a frame 12 mounted on the bottom surface 111, and two compression springs 13 secured to and disposed between the rear end portion 113 of the pad body 11 and the frame 12. When the rider is seated on the pad body 11 in a moving state, vibrations can be cushioned and absorbed by compression and resilience actions of the compression springs 13. However, since the rider may sway in not only up and down directions but also in right and left directions, the compression springs 13 tend to be undesirably twisted. As a result, the compression springs 13 cannot perform compression or resilience actions smoothly and have a poor cushioning effect. In addition, since the compression springs 13 are only secured to the rear end portion 113 of the pad body 11, the compression springs 13 can provide solely a localized but not complete cushioning effect. Such localized cushioning effect makes the rider seated on the seat assembly 11 uncomfortable.

SUMMARY OF THE INVENTION

Therefore, the object of the present invention is to provide a seat assembly having an improved cushioning effect.

According to this invention, a seat assembly includes: a pad body having front and rear end portions; and a supporting member secured to the pad body and including a frame that has front and rear end portions, a front resilient unit that extends from the front end portion of the frame and that is disposed between the pad body and the frame, and a rear resilient unit that extends from the rear end portion of the frame and that is disposed between the pad body and the frame. The front and rear resilient units support the front and rear end portions of the pad body, respectively.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
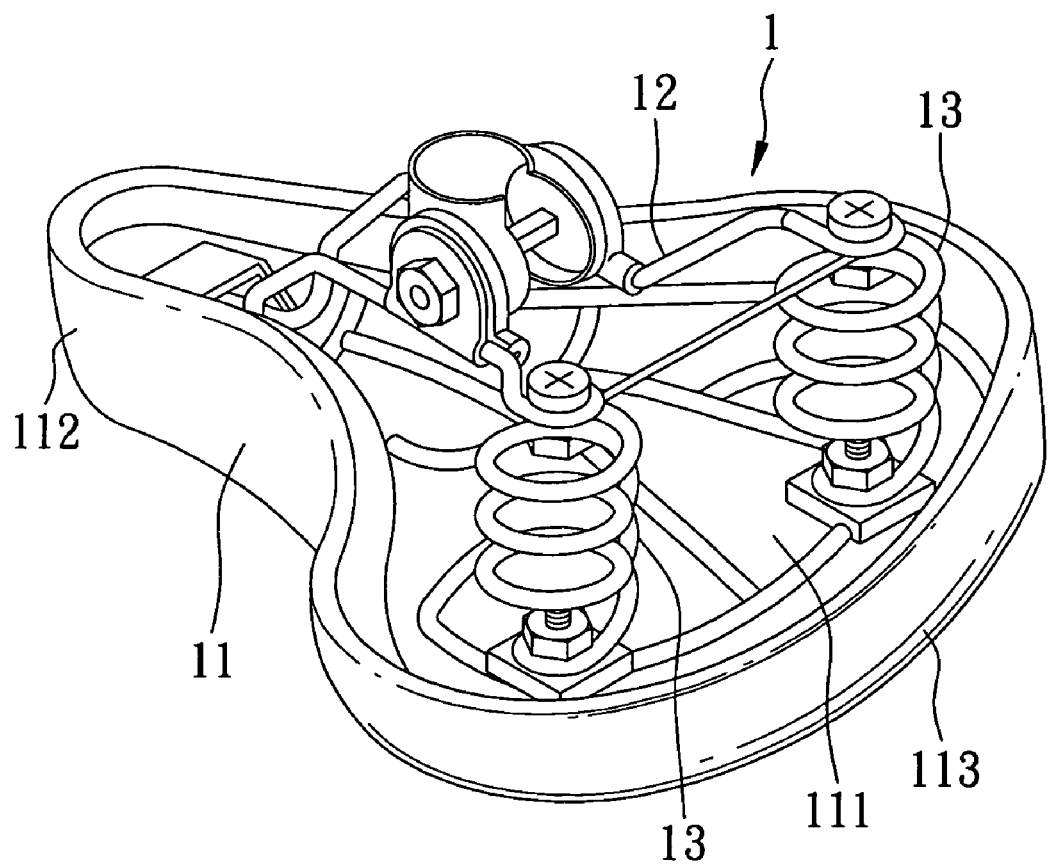
FIG. 1 is a perspective view to illustrate a conventional seat assembly.
Figure 2:
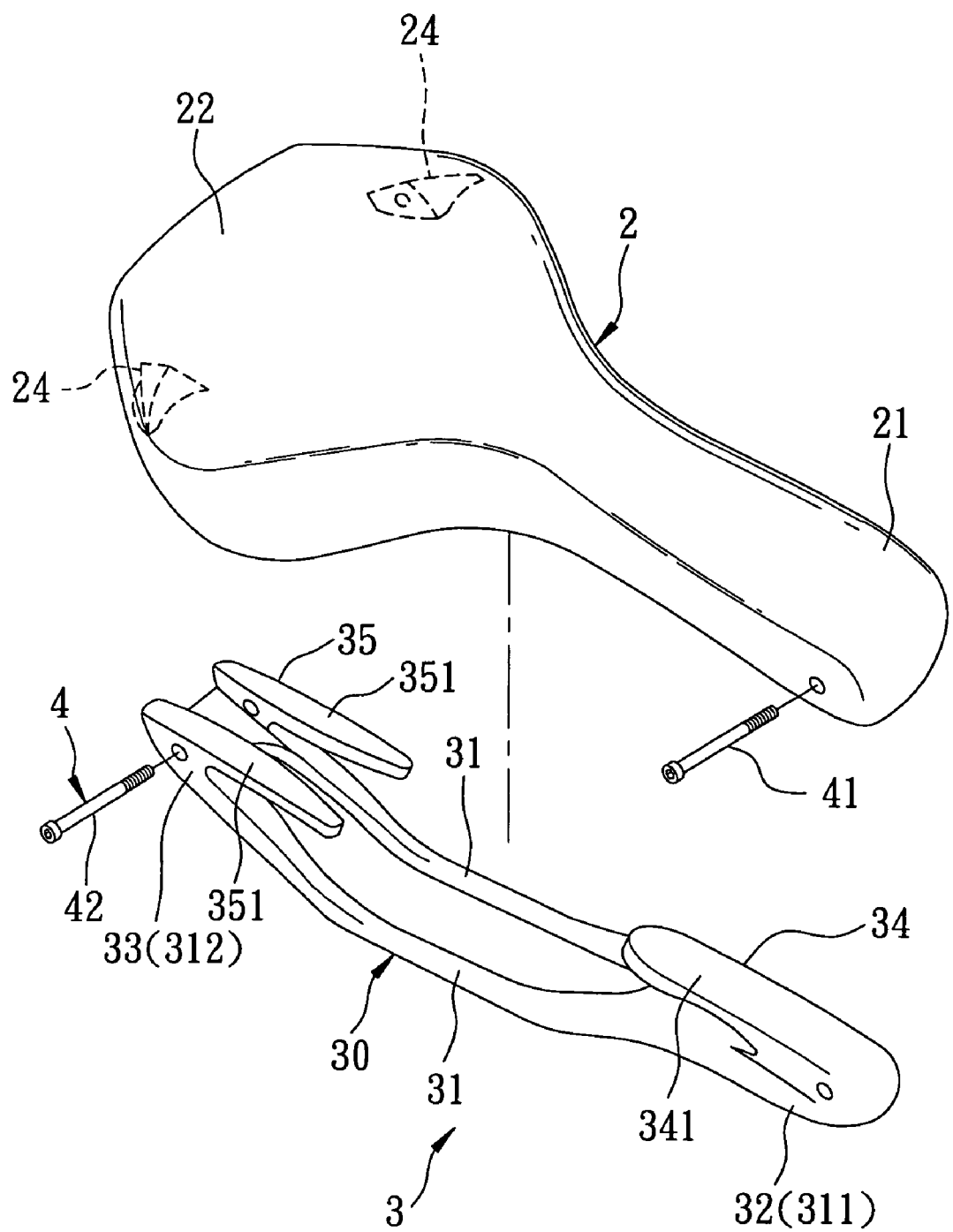
FIG. 2 is an exploded perspective view to illustrate the first preferred embodiment of a seat assembly according to this invention.

Referring to FIG. 2, the first preferred embodiment of a seat assembly according to this invention includes a pad body 2 having front and rear end portions 21, 22, and a supporting member 3 secured to the pad body 2. The supporting member 3 includes a frame 30 having front and rear end portions 32, 33, a front resilient unit 34 extending from the front end portion 32 of the frame 30 and disposed between the pad body 2 and the frame 30, and a rear resilient unit 35 extending from the rear end portion 33 of the frame 30 and disposed between the pad body 2 and the frame 30. The front and rear resilient units 34, 35 support the front and rear end portions 21, 22 of the pad body 2, respectively.

Preferably, the frame 30 includes a pair of opposing rib portions 31. Each of the opposing rib portions 31 has front and rear ends 311, 312. The front ends 311 of the rib portions 31 are connected to each other so as to define the front end portion 32 of the frame 30. The rear ends 312 of the rib portions 31 are connected to each other so as to define the rear end portion 33 of the frame 30.

Preferably, the front resilient unit 34 includes a front spring arm 341 that extends rearwardly from the front end portion 32 of the frame 30 and that forms an acute angle with the front end portion 32 of the frame 30. The rear resilient unit 35 includes a pair of opposing rear spring arms 351 that extend forwardly and respectively from the rear ends 312 of the rib portions 31. Each of the rear spring arms 351 forms an acute angle with the rear end 312 of the respective one of the rib portions 31. The front and rear end portions 21, 22 of the pad body 2 are seated on the front spring arm 341 and the rear spring arms 351, respectively. More preferably, the frame 30, the front spring arm 341 and the rear spring arms 351 are in the form of a single piece.

Additionally, the first preferred embodiment of the seat assembly according to this invention includes a fastening unit 4 for securing the support member 3 to the pad body 2. Preferably, the fastening unit 4 includes a rear screw bolt 42. The rear end portion 22 of the pad body 2 is provided with a pair of opposing lugs 24. The rear end portion 33 of the frame 30 is disposed between and is fastened to the lugs 24 through the rear screw bolt 42 that extends through the rear end portion 33 of the frame 30 and the lugs 24.

Figure 3:
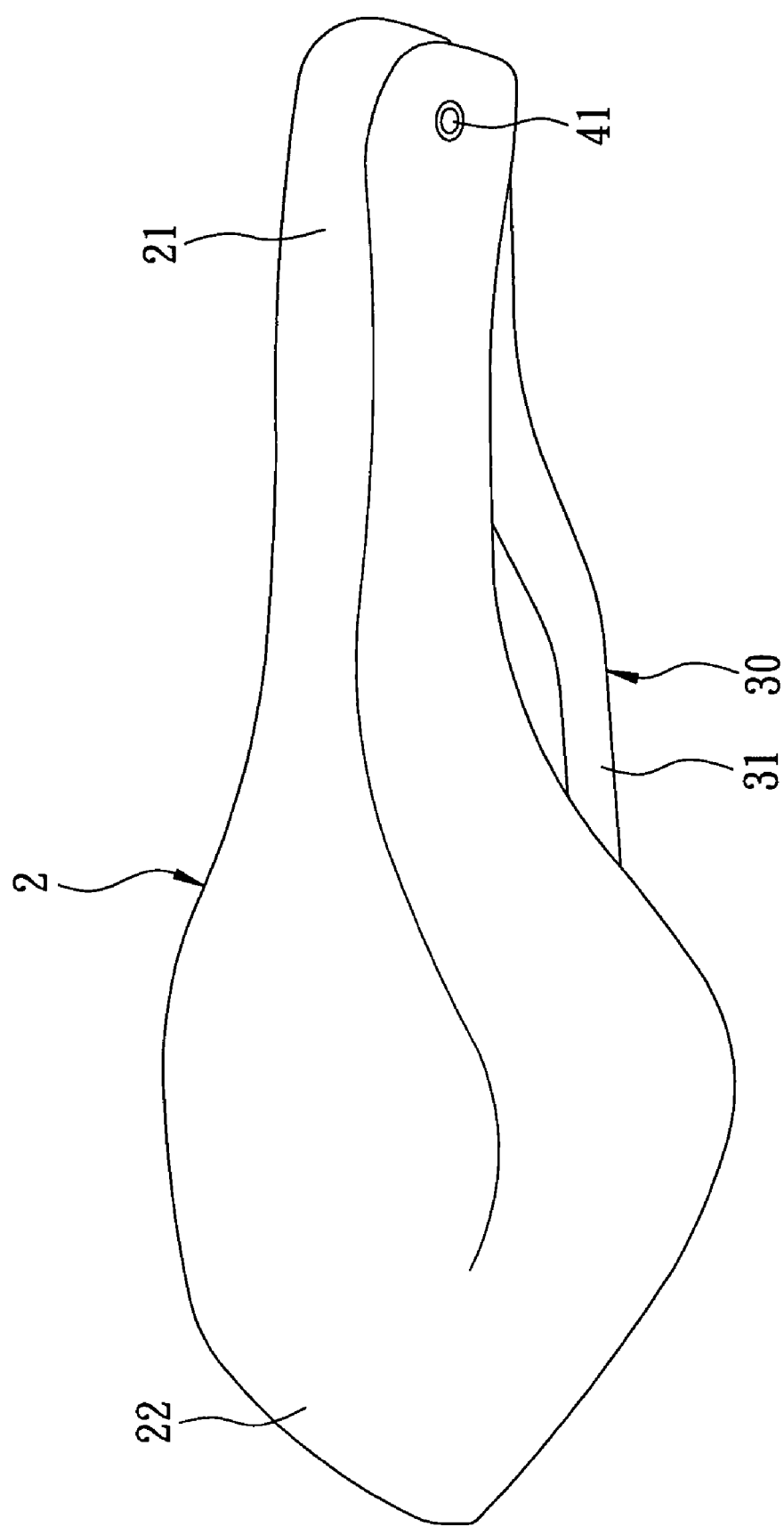
FIG. 3 is a perspective view to illustrate the first preferred embodiment of the seat assembly of FIG. 2 in an assembled state.

With further reference to FIG. 3, more preferably, the fastening unit 4 additionally includes a front screw bolt 41 extending through the front end portion 32 of the frame 30 and the front end portion 21 of the pad body 2.

Figure 4:
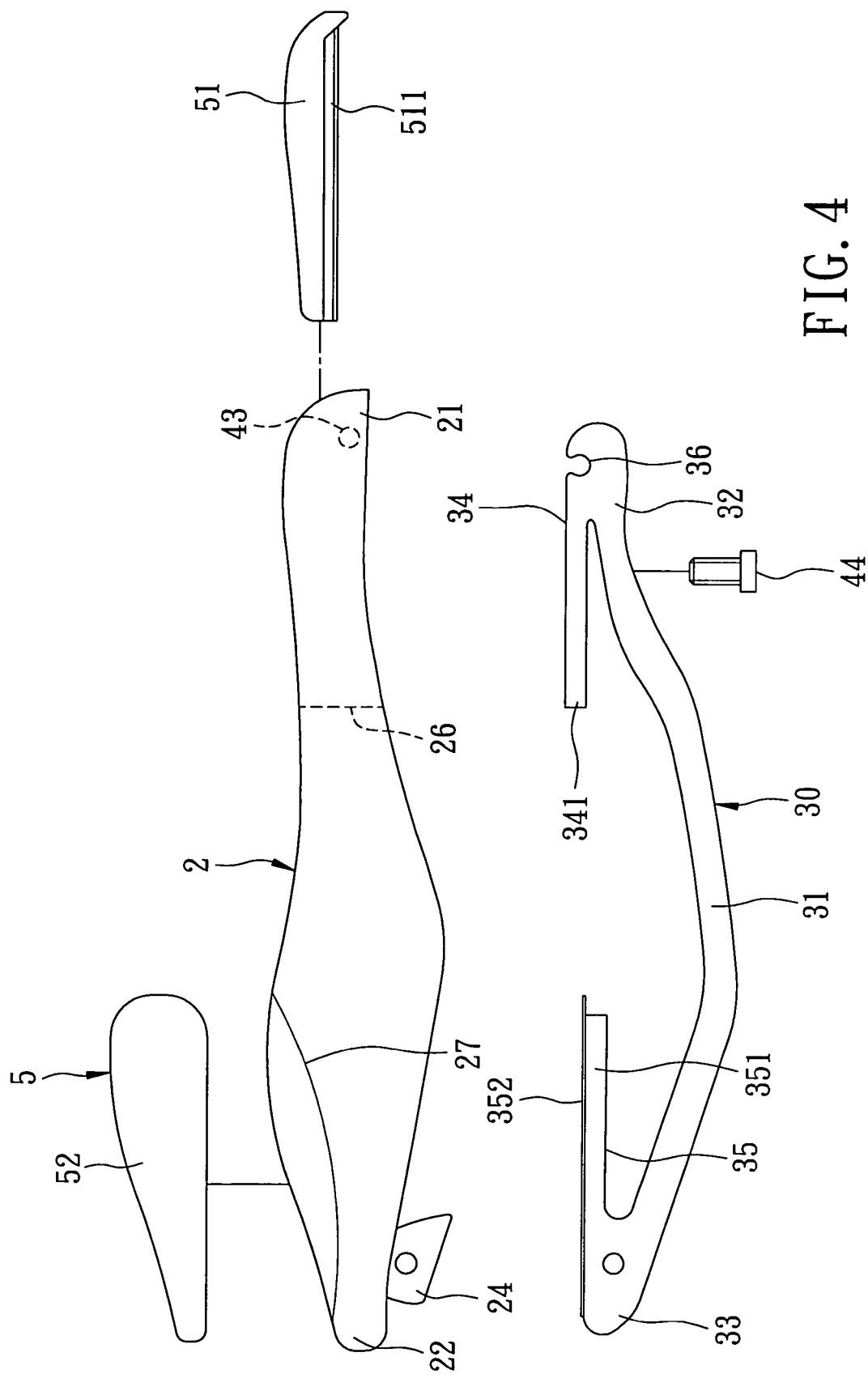
FIG. 4 is an exploded schematic view to illustrate the second preferred embodiment of a seat assembly according to this invention.
Figure 5:
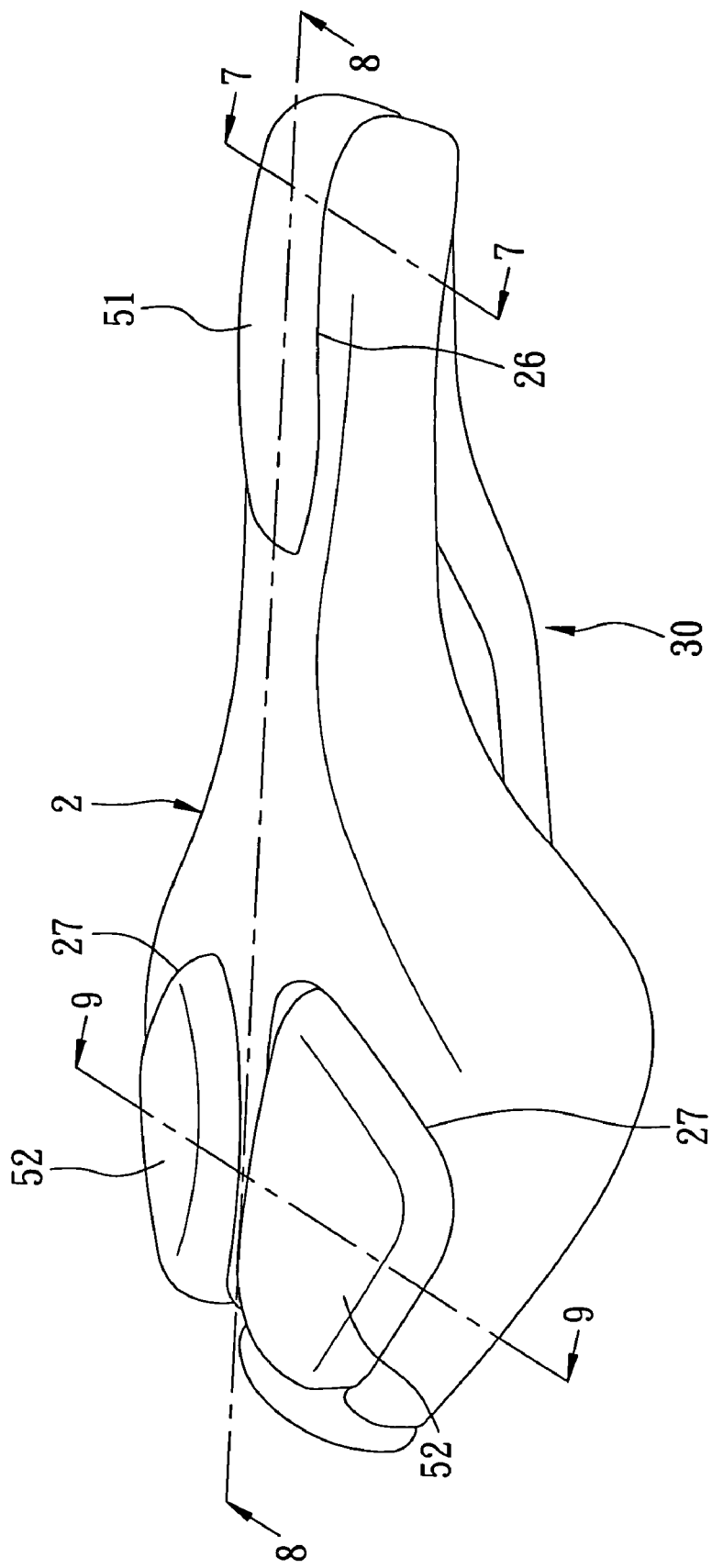
FIG. 5 is a perspective view to illustrate the second preferred embodiment of the seat assembly of FIG. 4 in an assembled state.
Figure 6:
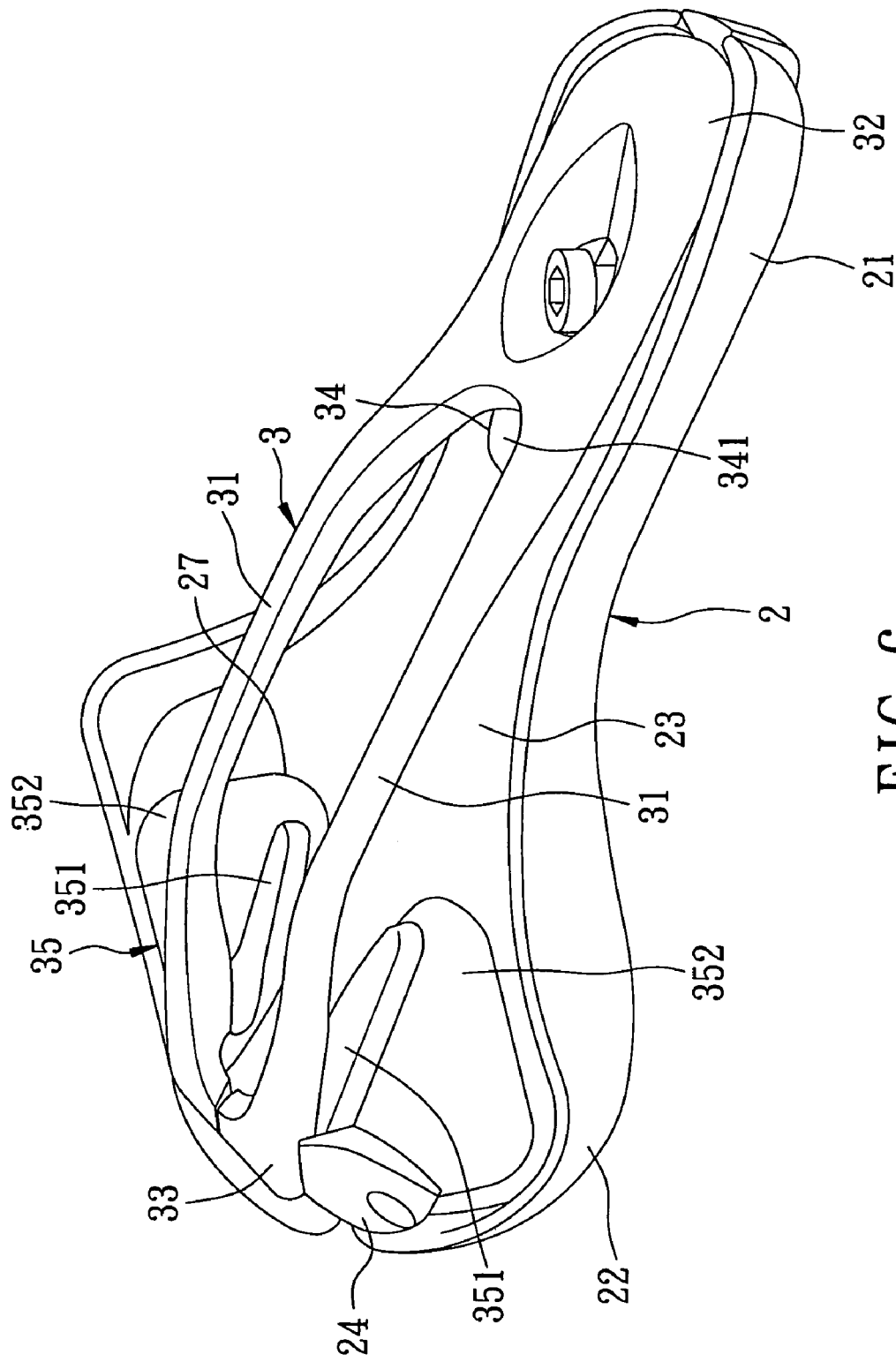
FIG. 6 is a perspective view to illustrate how a supporting member is secured to the pad body in the second preferred embodiment of the seat assembly of FIG. 4.
Figure 9:
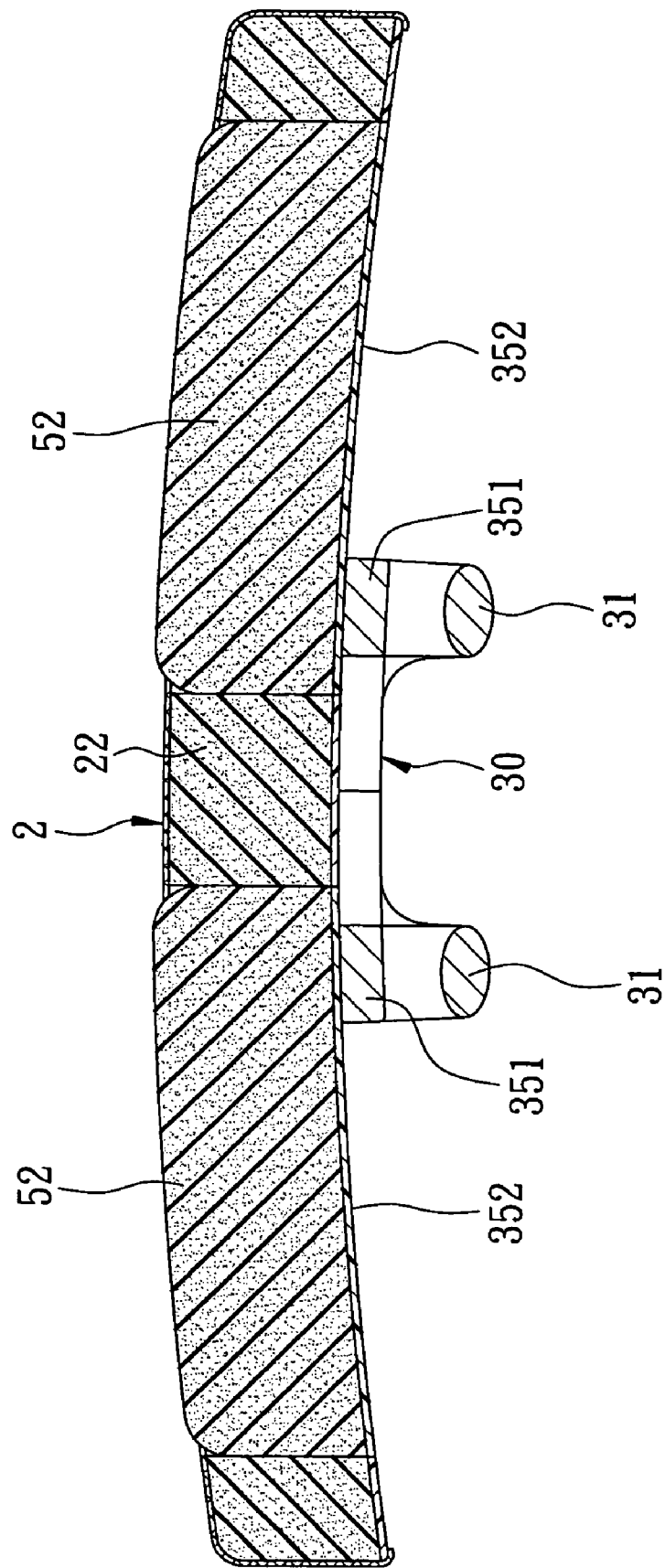
FIG. 9 is a sectional view taken along a line 9-9 of FIG. 5 to illustrate how a rear resilient unit supports the pad body in the second preferred embodiment of the seat assembly.

Referring to FIGS. 4 to 6, the second preferred embodiment of the seat assembly according to this invention is illustrated. The second preferred embodiment has a structure similar to that of the first preferred embodiment, except for the inclusion of a cushioning unit 5. The cushioning unit 5 has a front cushioning pad 51 and a pair of rear cushioning pads 52. Preferably, the pad body 2 is formed with a front hole 26 that receives fittingly the front cushioning pad 51, in a manner to permit seating of the front cushioning pad 51 on the first spring arm 341 of the front resilient unit 34, and a pair of rear holes 27 that receive fittingly and respectively the rear cushioning pads 52. More preferably, the supporting member 3 further includes a pair of rear wing plates 352 secured respectively to the rear spring arms 351 in such a manner that the rear cushioning pads 52 are seated on and are secured to the rear wing plates 352, respectively, as best shown in FIG. 9.

Figure 7:
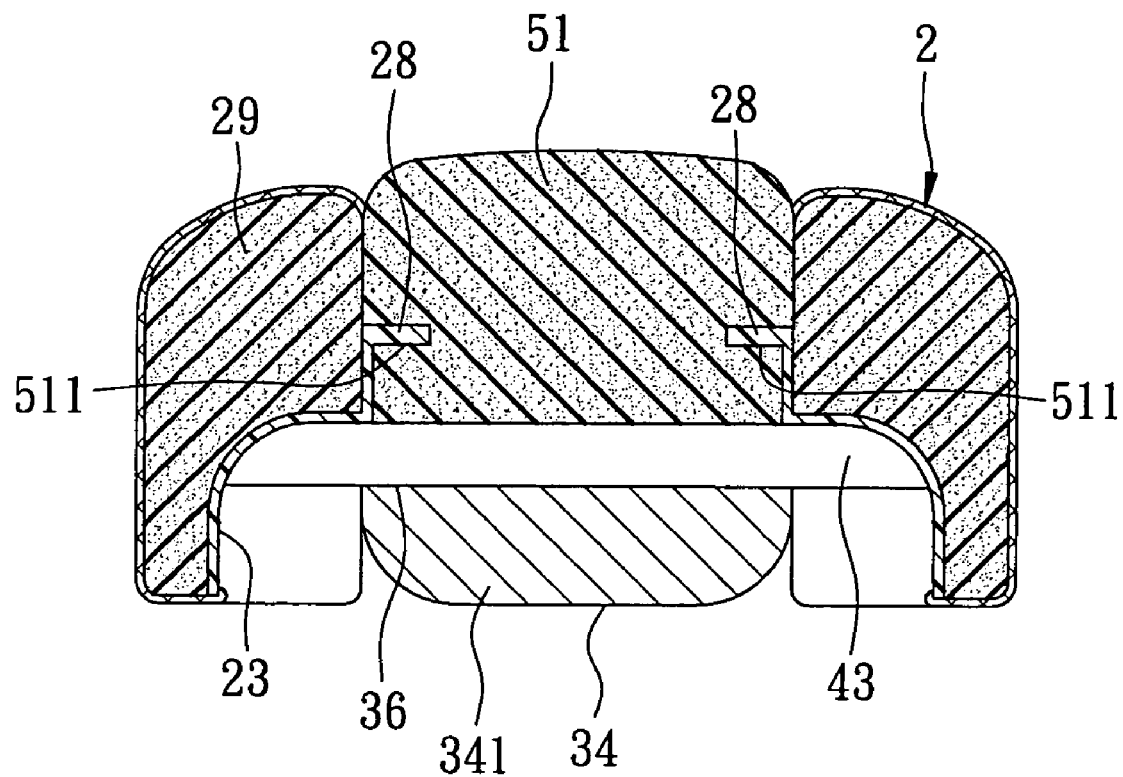
FIG. 7 is a sectional view taken along a line 7-7 of FIG. 5 to illustrate how a front cushioning pad is mounted on the pad body in the second preferred embodiment of the seat assembly.

With further reference to FIG. 7, in another preferred arrangement of the second preferred embodiment, the pad body 2 includes a skeleton 23 and a cover sleeve 29 on the skeleton 23. The skeleton 23 has a pair of opposing retaining protrusions 28 that extend into the front cushioning pad 51. More preferably, the front cushioning pad 51 is formed with a pair of opposing retaining grooves 511, and each of the opposing retaining protrusions 28 extends into and engages a corresponding one of the retaining grooves 511 in the front cushioning pad 51.

Figure 8:
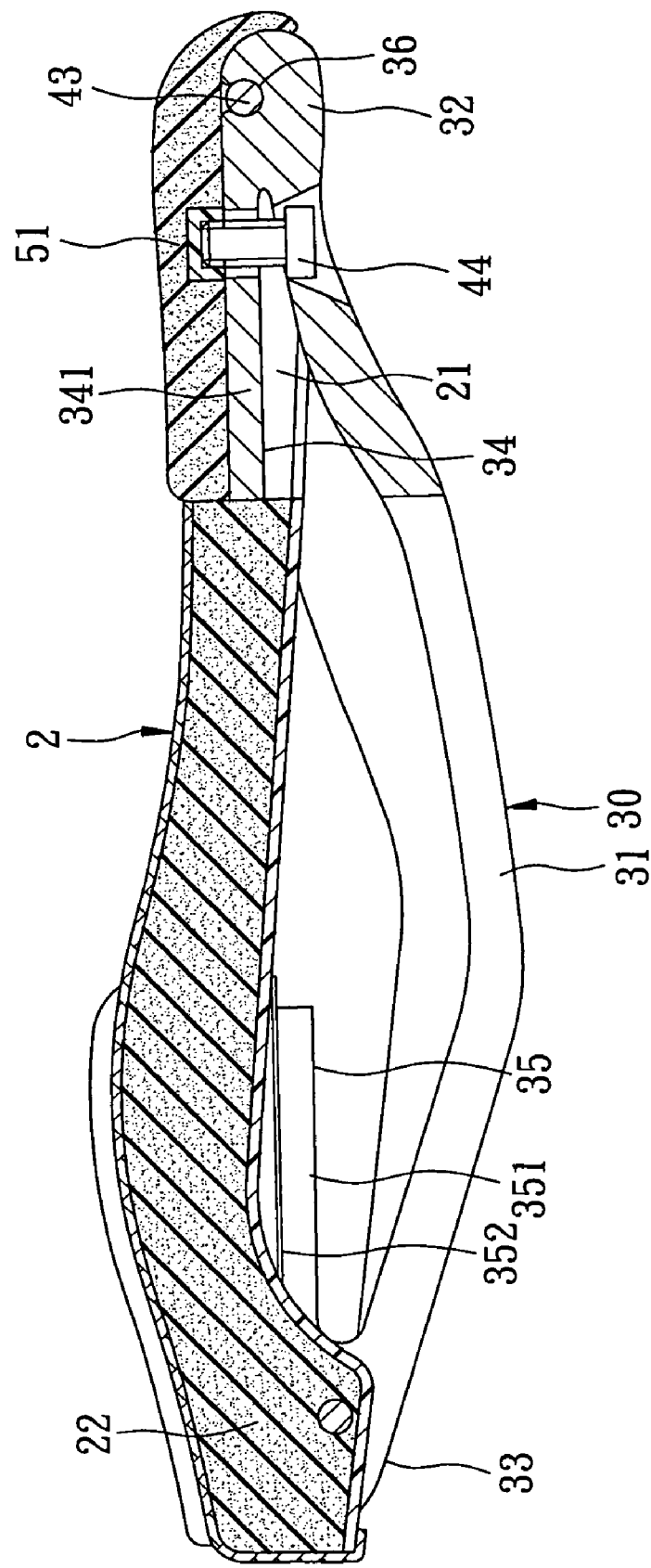
FIG. 8 is a sectional view taken along a line 8-8 of FIG. 5 to illustrate how a front resilient unit supports the pad body in the second preferred embodiment of the seat assembly.

Referring to FIGS. 4 and 8, in yet another preferred arrangement of the second preferred embodiment, the fastening unit 4 further includes a stopper 43 that is in the form of a pin. The front end portion 32 of the frame 30 is formed with a retaining groove 36, and the stopper 43 extends through the retaining groove 36 and the front end portion 21 of the pad body 2.

Additionally, the fastening unit 4 may further include an auxiliary screw bolt 44 that extends into the front end portion 21 of the pad body 2 through the front end portion 32 and the front spring arm 341 of the frame 30, thereby strengthening the fastening of the front cushioning pad 51 to the pad body 2. The rear cushioning pads 52 can be secured to the rear wing plates 352 through bonding techniques or by screw bolts (not shown).

In view of the foregoing, the contact area of the pad body 2 with the front and rear resilient units 34, 35 in the seat assembly of this invention is larger than that of the pad body 11 with the compression springs 13 in the conventional seat assembly. Hence, the seat assembly according to this invention has an improved cushioning effect. Besides, since the front and rear spring arms 341, 351 that extend rearwardly and forwardly, from the front and rear end portions 34, 35 of the frame 30, respectively, are used to replace the compression springs 13, the tendency of twist experienced by the compression springs 13 can be avoided. Additionally, by virtue of the arrangement of the front and rear cushioning pads 51, 52, the force exerted by the rider on the seat assembly of this invention can be primarily concentrated on the front and rear cushioning pads 51, 52 that are directly secured to the front and rear spring arms 341, 351, respectively. As a result, undesired friction between the cover sleeve 29 and the supporting member 3 is reduced to extend the service life of the pad body 2.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A seat assembly comprising:
   a pad body having front and rear end portions; and
   a supporting member secured to said pad body and including a frame that has front and rear end portions, a front resilient unit that extends from said front end portion of said frame and that is disposed between said pad body and said frame, and a rear resilient unit that extends from said rear end portion of said frame and that is disposed between said pad body and said frame, said front and rear resilient units supporting said front and rear end portions of said pad body, respectively,
   wherein said frame includes a pair of opposing rib portions, each of which has front and rear ends, said front ends of said rib portions being connected to each other so as to define said front end portion of said frame, said rear ends of said rib portions being connected to each other so as to define said rear end portion of said frame, said front resilient unit including a front spring arm that extends rearwardly from said front end portion of said frame and that forms an acute angle with said front end portion of said frame, said rear resilient unit including a pair of opposing rear spring arms that extend forwardly and respectively from said rear ends of said rib portions, each of said rear spring arms forming an acute angle with said rear end of the respective one of said rib portions, said front and rear end portions of said pad body being seated on said front and rear spring arms, respectively, the seat assembly further comprising:
   a cushioning unit having a front cushioning pad and a pair of rear cushioning pads, said pad body being formed with a front hole that receives fittingly said front cushioning pad, and a pair of rear holes that receive fittingly and respectively said rear cushioning pads, wherein said supporting member further includes a pair of rear wing plates secured respectively to said rear spring arms, said rear cushioning pads being seated on and secured to said rear wing plates, respectively.

2. The seat assembly of claim 1, wherein said frame and said front and rear spring arms are in the form of a single piece.

3. The seat assembly of claim 1, further comprising a fastening unit that includes a rear screw bolt, said rear end portion of said pad body being provided with a pair of opposing lugs, said rear end portion of said frame being disposed between and being fastened to said lugs through said rear screw bolt that extends through said rear end portion of said frame and said lugs.

4. The seat assembly of claim 3, wherein said fastening unit further includes a stopper that is in the form of a pin, said front end portion of said frame being formed with a retaining groove, said stopper extending through said retaining groove and said front end portion of said pad body.

5. The seat assembly of claim 3, wherein said fastening unit further includes a front bolt that extends through said front end portion of said frame and said front end portion of said pad body.

6. The seat assembly of claim 1, wherein said pad body includes a skeleton and a cover sleeve on said skeleton, said skeleton having a pair of opposing retaining protrusions that extend into said front cushioning pad.

* * * * *